United States Patent
Li et al.

(10) Patent No.: US 12,287,726 B2
(45) Date of Patent: Apr. 29, 2025

(54) SYSTEM AND METHOD FOR GENERATING FAILING TESTS FROM FAILED PROOFS

(71) Applicants: Constructor Technology AG, Schaffhausen (CH); Constructor Education and Research Genossenschaft, Schaffhausen (CH)

(72) Inventors: Huang Li, Shenzen (CN); Bertrand Meyer, Zurich (CH)

(73) Assignee: Constructor Education and Research Genossenschaft, Schaffhausen (CH)

( * ) Notice: Subject to any disclaimer, the term of this patent is extended or adjusted under 35 U.S.C. 154(b) by 129 days.

(21) Appl. No.: 17/818,348

(22) Filed: Aug. 8, 2022

(65) Prior Publication Data

US 2024/0045791 A1 Feb. 8, 2024

(51) Int. Cl.
*G06F 11/36* (2006.01)
*G06F 11/3604* (2025.01)
*G06F 11/3668* (2025.01)

(52) U.S. Cl.
CPC ...... *G06F 11/3684* (2013.01); *G06F 11/3608* (2013.01); *G06F 11/3688* (2013.01)

(58) Field of Classification Search
CPC ............. G06F 11/3608; G06F 11/3604; G06F 11/3688; G06F 11/3684
See application file for complete search history.

(56) References Cited

U.S. PATENT DOCUMENTS

| | | | |
|---|---|---|---|
| 7,584,455 B2 * | 9/2009 | Ball | G06F 11/3676 717/124 |
| 8,464,204 B1 * | 6/2013 | Thornton | G06F 11/3608 717/100 |

(Continued)

FOREIGN PATENT DOCUMENTS

| CN | 112631909 A | 4/2021 |
|---|---|---|
| CN | 113377676 A | 9/2021 |

OTHER PUBLICATIONS

Wahab, Matthew, Object code verification, PhD thesis, University of Warwick (Year: 1998).*

(Continued)

*Primary Examiner* — Wei Y Zhen
*Assistant Examiner* — Amir Soltanzadeh
(74) *Attorney, Agent, or Firm* — ESPE Legal Consultancy FZ-LLC

(57) ABSTRACT

A method for verifying a set of computer-executable instructions using at least one failing test generated by a test-case generator is disclosed herein. The method comprises verifying the set of computer-executable instructions by a verification module using a plurality of predefined verification conditions; determining if the verification is successful; in response to successful verification, label the set of computer-executable instructions as successful; and in response to unsuccessful verification, generate at least one counterexample, with respect to a proof failure and corresponding to at least one failed verification condition of the plurality of the predefined verification conditions, and generate a failing test, by a test-case generator, based on at least one counterexample. A program verification tool for testing the set of computer-executable instructions is also disclosed.

20 Claims, 5 Drawing Sheets

(56) References Cited

U.S. PATENT DOCUMENTS

| | | | | |
|---|---|---|---|---|
| 8,549,486 | B2* | 10/2013 | Godefroid | G06F 11/3688 |
| | | | | 717/128 |
| 9,015,674 | B2* | 4/2015 | DeLine | G06F 8/75 |
| | | | | 717/126 |
| 10,169,217 | B2* | 1/2019 | Yu | G06F 11/3604 |
| 10,733,074 | B1* | 8/2020 | Cok | G06F 11/3608 |
| 11,550,923 | B2* | 1/2023 | Weber | G06F 11/3604 |
| 2007/0038894 | A1* | 2/2007 | Stasa | G06F 11/3688 |
| | | | | 714/38.1 |
| 2007/0061783 | A1* | 3/2007 | Prakash | G06F 9/505 |
| | | | | 717/145 |
| 2009/0125891 | A1* | 5/2009 | Garimella | G06F 11/3612 |
| | | | | 717/131 |
| 2014/0298472 | A1* | 10/2014 | Kouskoulas | G06F 21/577 |
| | | | | 726/25 |
| 2020/0073783 | A1* | 3/2020 | Hortala | G06F 9/54 |
| 2020/0285570 | A1* | 9/2020 | Knaack | G06F 11/3688 |
| 2021/0058249 | A1* | 2/2021 | Jeon | H04L 9/0643 |

OTHER PUBLICATIONS

B. Wegbreit, Constructive Methods in Program Verification, IEEE Transactions on Software Engineering ( vol. SE-3, Issue: 3, May 1977) (Year: 1977).*

* cited by examiner

SYSTEM AND METHOD FOR GENERATING FAILING TESTS FROM FAILED PROOFS

FIELD OF THE INVENTION

The invention generally relates to testing of computer-executable instructions. Particularly, the invention relates to a system and method for generating tests that will fail, based on failed proofs, for testing a set of computer-executable instructions.

BACKGROUND OF THE INVENTION

With the advent of modern technology, the development of cost-effective and correct software code that is resilient to program bugs is crucial for enabling hardware systems. For example, a software code implemented to enable the functionality of an MRI (Magnetic Resonance Imaging) machine must be flawless and ensure the utmost safety parameters; as such, under no circumstances should the machine cause any harm to a patient. Therefore, any software code for an essential function should be essentially error-free and fail-proof when first implemented. Therefore, sophisticated schemes for discovering bugs in such code, including lexical, syntactic, semantic, and logical faults, have been developed.

Yet, due to complexities of software code, it is difficult for software developers to develop software that is fail-proof and free from errors, flaws, and faults that cause the system to produce an incorrect or unexpected result, or to behave in unintended ways. Most developers ensure software quality through methodology in design and implementation or through development and execution of the testing process to minimize the number of faults. Currently, many methodologies have been developed that allow development of test plans and detailed test cases based on system's design and requirements.

Most modern software systems and components go through rigorous testing before they are released to the users. The major challenge to the testing process is the overwhelming number of test scenarios.

An alternative to testing is program proving. The program-proving approach starts with the development of a mathematical model of programming languages and programs, thereby making it possible to prove that a program satisfies a particular specification. Such proofs are of the same nature as typical proofs in standard mathematical work, but in practice differ from them by their size. For example, a proof of correctness for a computer program may involve a very large number of steps. Even though some of the steps are relatively trivial considered in isolation, they are nonetheless necessary to make sure that the proof misses no case in the astronomical number of possible execution scenarios for a typical computer program. As a result, the practice of program proving cannot just rely on human verification, as is usually the case for proofs in standard mathematical work but requires sophisticated software tools known as "program provers."

The practice of program proving raises an important problem for the persons doing the proof. The human process of trying to prove a program correct is incremental and often arduous; the initial attempt to prove a program part correct will usually fail, because of several possible reasons: the program part may be incorrect; or the specification of the program part, describing what needs to be proved, may be incorrect; or the proof attempt may have encountered a limitation of the program prover, as all practical program provers have limitations; or there may be a combination of any of these obstacles. Unlike a failed test, however, a failed proof attempt is unhelpful. A failed test reveals a specific combination of input values that concretely helps a programmer understand what is wrong; in contrast, a failed proof often indicates that the prover could not prove the correctness of the corresponding program part, without any further concrete indication that could help the programmer uncover the actual underlying problem with the program part or its specification. The failed proof does not point the developer to the exact point in source code and the exact values of variables that are involved in the execution of a scenario that violates one of the constraints.

Considering these two approaches, program testing and program proving, it can be noted that tests are easier to conduct but do not guarantee the correctness of the software. On the other hand, proofs guarantee correctness, based on mathematical certainty supported by computer tools, but successful proofs are difficult to obtain.

Therefore, there is a need to bridge the gap between program proofs and identification of specific test cases that cause the program to fail.

SUMMARY OF THE INVENTION

The invention relates to a method for verifying a set of computer-executable instructions using at least one failing test generated by a test-case generator. The method comprises verifying the set of computer-executable instructions by a program-proving module using a plurality of predefined verification conditions, determining if the proof is successful, and in response to the successful verification, labeling the set of computer-executable instructions as correct. In response to unsuccessful verification, at least one counterexample is generated, with respect to a proof failure and corresponding to at least one failed verification condition of the plurality of the predefined verification conditions. A failing test is generated by a test-case generator, based on at least one counterexample.

In an alternative embodiment, the failing-test generation comprises obtaining, by a controller component, a list of erroneous functions from the proving module. A program parser extracts context information relating to the obtained erroneous functions. A counterexample parser parses at least one counterexample to extract test data from at least one counterexample. The test data comprises values of relevant input variables. A test case is generated based on the context information and the test data, to test the obtained erroneous functions.

In an alternative embodiment, the generated test case is applied to the erroneous function to identify a bug present in the erroneous function, and upon identification, the bug is rectified, and the erroneous function is corrected.

In an alternative embodiment, the method further comprises running the failing test step by step and observing the program's evolution in response to a failure state.

In an alternative embodiment, the method further comprises repeating the failing test upon fixing the program, so that programmers can re-run the proof and repeat the process until no proof failure occurs.

In an alternative embodiment, the method further comprises interfacing the set of computer-executable instructions with the verification module through a Verifier Application Programming Interface (API).

In an alternative embodiment, the method further comprises implementing an integrated development environment (IDE) for verification.

In an alternative embodiment, the method further comprises generating a test case for a specific function based upon a set of specific values for the input arguments.

In an alternative embodiment, the method further comprises translating the set of computer-executable instructions into intermediate instructions and translating the intermediate instructions into a collection of verification conditions based on specific formal semantics including axiomatic semantics, Hoare logic, and Dijkstra's weakest-precondition calculus.

In an alternative embodiment, the method further comprises receiving the plurality of the verification conditions by a Theorem Prover for determining validity of the plurality of verification conditions.

In an alternative embodiment, the method further comprises producing the counterexample that is an indicative of a proof failure of an execution trace.

The invention also relates to a program verification tool to verify a set of computer-executable instructions using at least one failing test generated by a test-case generator. The program verification tool comprises a verification module that includes a verification condition generator. The verification condition generator is configured to generate a plurality of predefined verification conditions. The verification condition generator verifies the set of computer-executable instructions based on the predefined verification conditions and determines failed verification conditions. The program verification tool further comprises a theorem prover to produce a counterexample, with respect to a proof failure, corresponding to a failed verification condition. A counterexample in this embodiment is an execution trace that is indicative of a proof failure. The test-case generator is configured to receive, from the verification module, at least one erroneous function that failed to match the predefined verification conditions and extract context data from at least one erroneous function. The test-case generator receives, from the verification module, the counterexamples and extract test data from the counterexamples, wherein the test data includes values of the input variables relevant to at least one erroneous function. A test case of a failing test is constructed based on the context data and the test data. The program verification tool is configured to run the failing test step by step to observe the execution of the set of computer-executable instructions leading to a failure state, and wherein bugs from the erroneous functions are removed based on the failing tests. The failing tests are run on the set of computer-executable instructions until the set of computer-executable instructions are verified in the verification module.

In an alternative embodiment, the verification module comprises a verifier Application Programming Interface (API) providing a programming interface for the program verification tool. In an embodiment, the verifier API corresponds to a verification language. A program translator receives the set of computer-executable instructions and translates the set of computer-executable instructions into intermediate instructions written in a verification language. A verification condition generator translates the intermediate instructions into a collection of verification conditions and generates a set of predefined verification conditions.

In an alternative embodiment, the test-case generator comprises a controller component to obtain a list of erroneous functions from the verification module. A program parser parses intermediate instructions corresponding to the set of computer-executable instructions and extracts context data. A counterexample parser parses the counterexamples and extracts test data. A test-case constructor, in communication with the program parser and the counterexample parser, constructs the test case of the failing test based on the context data and the test data.

In an alternative embodiment, the translation by the verification condition generator is performed based on one or more formal semantics including axiomatic semantics, Hoare logic, and Dijkstra's weakest precondition.

In an alternative embodiment, the test data include values of relevant input variables. In some embodiments, the value can be divided into basic values and reference values.

In an alternative embodiment, the program verification tool further comprises a data store to store a set of executable computer instructions. Examples of such instructions include a counterexample, a type property of the verification conditions, argument information relating to the erroneous functions, test data extracted from the counterexample, and the text of test cases.

In an alternative embodiment, the program verification tool further comprises a debugger for debugging the erroneous function based on the generated test case at each step and repeating the debugging till the set of computer-executable instructions are corrected.

DETAILED DESCRIPTION

The invention is a test-case generator that automatically generates test cases in the presence of proof failures, with the objective of providing the programmers with immediately exploitable information to correct the program thanks to a failing test.

Formal verification uses formal methods or mathematics to prove or disprove the correctness of a program with respect to properties given as formal specifications. An exemplary form of formal specification is contracts, which are logical predicates embedded inside the program. Contracts may include a plurality of pre- and post-conditions, loop invariant and specific user-specified assertions.

Various technologies pertaining to the invention will now be described with reference to the drawings. The components and systems described encompass computer-readable data storage configured with computer-executable instructions that cause certain functionality to be performed when executed by a processor. The computer-executable instructions may include a routine, a function, a program, or the like.

Figure 1:
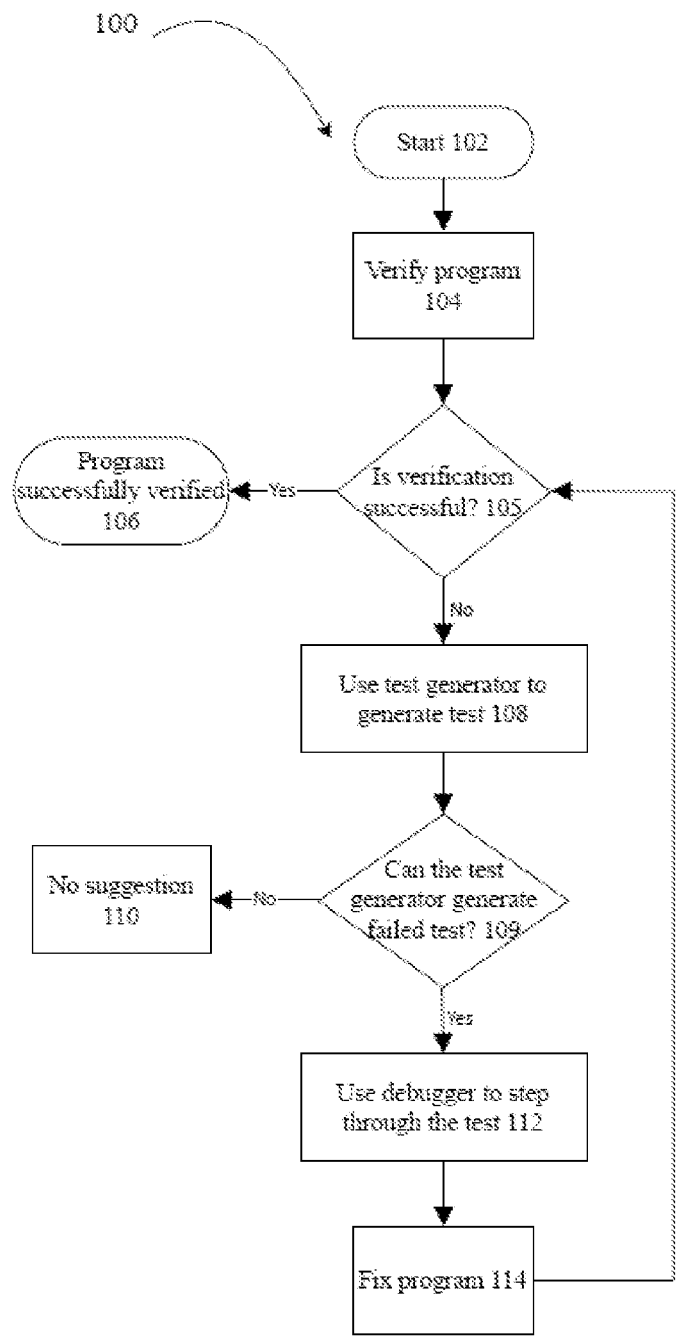
FIG. 1 shows a flowchart depicting operation of a program verification tool, in accordance with an embodiment of the invention.

FIG. 1 shows a flowchart depicting operation of a program verification tool, in accordance with an embodiment of the invention. With reference to FIG. 1, an exemplary methodology that helps programmers to diagnose and resolve proof failures when verifying a computer-executable program is illustrated. In accordance with an embodiment, step 102 indicates starting of operation 100 of the program verification tool. At step 104, operation 100 of the program verification tool involves verifying an input program, where the input program is a set of computer-executable instructions that is to be verified. In an embodiment, the verification of the input program may be performed to obtain failed proofs. At step 105, operation 100 includes querying if the verification is successful. In response to a successful verification of the input program, operation 100 proceeds to step 106, which indicates successful verification of the input program. However, in response to a failure of a verification step, operation 100 proceeds to generate a failed test for further verification and correction of the program. To generate the test, the input program is fed to a test-case generator at step 108 and the test-case generator is initiated for generating a failed test. At step 109, operation 100 includes querying if the test-case generator can generate a failed test. If the test-case generator cannot produce the failed test for the input program, operation 100 proceeds to step 110, where operation 100 does not provide any suggestion for rectification of the input program. If the test-case generator produces a failed test at step 108 for the input program, then operation 100 proceeds to step 112 where a debugger is used to run the test step by step. In this step, the programmer can observe how the input program evolves to a failure state. While debugging, programmers can inspect the faulty behavior of the program, whereafter operation 100 proceeds to step 114 where the input program is fixed by the programmer. Upon fixing the program, operation 100 then loops back to step 104 for repeating the entire operation as described above so that the programmers can re-run the proof and repeat operation 100 until no proof failure occurs and the input program is rectified.

Figure 2:
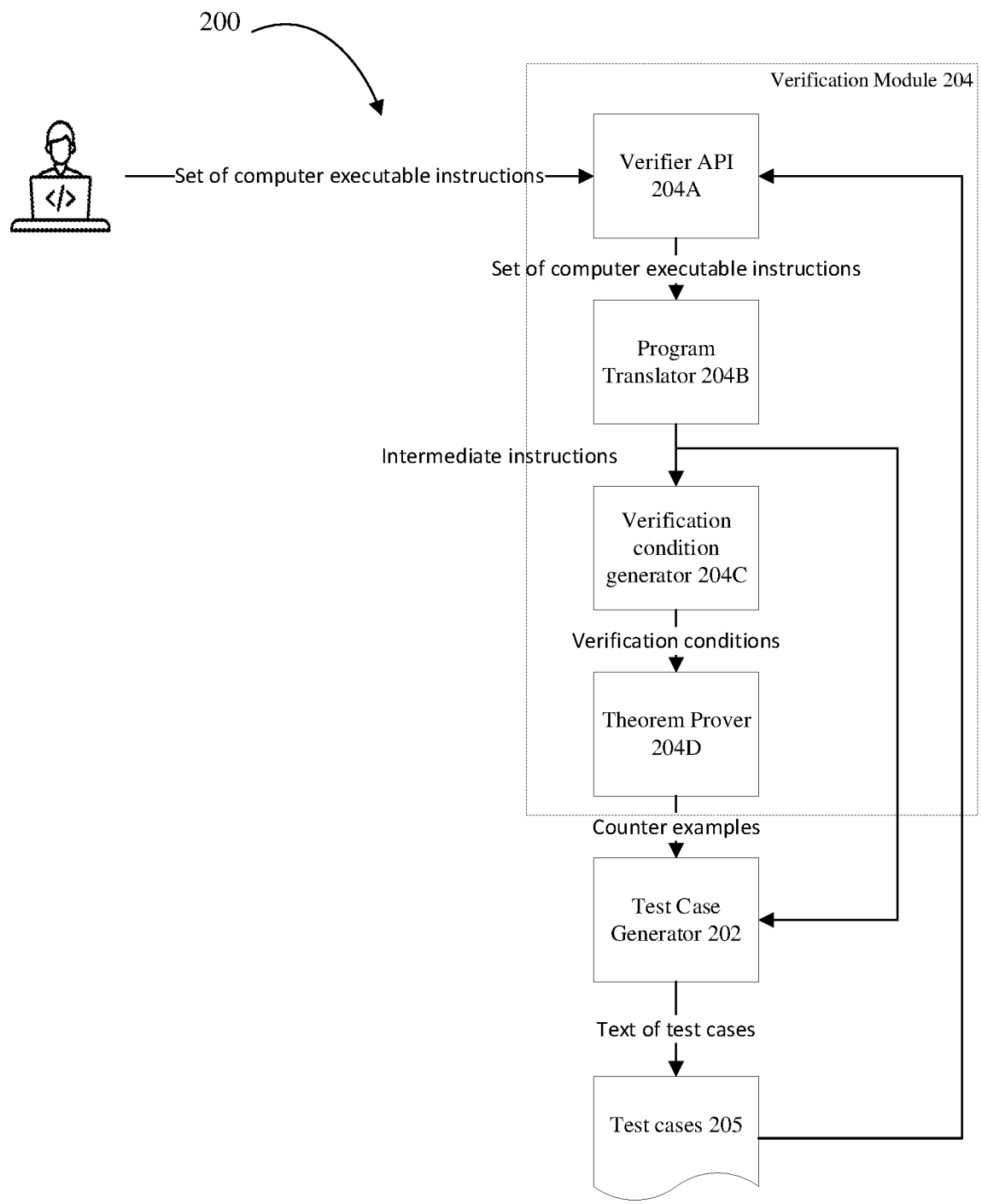
FIG. 2 shows a block diagram of the program verification tool, in accordance with an embodiment of the invention.

FIG. 2 shows a block diagram of the program verification tool 200, in accordance with an embodiment of the invention. The program verification tool 200 is configured to verify a set of computer-executable instructions using at least one failing test generated by a test-case generator 202. In accordance with an embodiment of the invention, the program verification tool 200 comprises a verification module 204. The verification module 204 is configured to generate a plurality of predefined verification conditions; verify the set of computer-executable instructions based on the predefined verification conditions; and determine failed verification conditions.

In one embodiment, the verification module 204 includes a verifier Application Programming Interface (hereinafter referred to as verifier API) 204A for providing a programming interface for the program verification tool 200. In one embodiment, the verifier API 204A corresponds to a programming language with verification conditions. In an exemplary embodiment, the verifier API 204A can include an integrated development environment (IDE). In another embodiment, the verifier API 204A corresponds to a programming language in which the set of computer-executable instructions are provided as input to the verifier API 204A. In one example, the set of computer-executable instructions may be provided by the programmer in any suitable programming language, including but not limited to C, C#, Java, Eiffel, or the like. In one embodiment, the set of computer-executable instructions can include a plurality of lines of code. In an exemplary embodiment, the plurality of lines of code that comprises between tens of lines of code and thousands of lines of code. The program can consist of several functions or procedures. Each function or procedure can include several input arguments and conventional program constructs, assignment statements, conditionals, and loops.

The verification module 204 further includes a program translator 204B. The program translator 204B is configured to receive the set of computer-executable instructions from the verifier API 204A and translate the set of computer-executable instructions into intermediate instructions written in a verification language. Translation process described herein relates to converting the program written in a procedural language, for example in Eiffel language (an object-oriented language), into a language that is not restricted to procedural programming constructs but operates using a different modality. For example, instead of execution being driven solely by control explicitly passing between different procedures, the language may operate in a modality that involves data flowing between different programming entities to drive execution, alone or in combination with explicit control flow. In other words, the procedural programming language is translated into dataflow components. Methods of the data translation include, but may not be limited to dataflow graph representation, component parallelism, data parallelism, and pipeline parallelism. Parallelism allows the program written into a procedural programming language to be translated into segments or components that may be processed simultaneously, thereby allowing overall effectiveness of the testing procedure. The translated components can be referred to as an intermediate dataset, and all intermediate datasets form an intermediate program. In one example, the intermediate program is written in Boogie language by the program translator 204B.

The verification module 204 further comprises a verification condition generator 204C to translate the intermediate instructions into a collection of verification conditions and generate a set of predefined verification conditions. In an example where the verification language is Boogie, the Verification Condition Generator 204C refers to the Boogie verifier, which generates from a Boogie program a set of predefined verification conditions. In an exemplary embodiment, the translation can be performed based on certain formal semantics of the program, such as axiomatic semantics, Hoare logic, and Dijkstra's weakest precondition.

The verification module 204 further includes a theorem prover 204D to produce counterexamples with respect to a proof failure, corresponding to the failed verification conditions, wherein the counterexample is an execution trace that is indicative of a proof failure. The theorem prover typically is instigated to provide mathematically-sound proofs of theorems. One prominent method of theorem proving is an Automated Theorem Proving (ATP) which is a subfield of automated reasoning and mathematical logic dealing with proving mathematical theorems automatically by computer programs. It often uses software design and program codes to verify that the designs and implementations are error-free, at least for certain types of errors. The application of ATP to mathematically verify properties of software codes is commonly referred to as "formal verification." Formal verification proves a mathematical theorem for a dataset or function of the software code, and in case of flawed dataset, generated a failed proof. As a result of the failed proof, a counterexample is generated which is indicative of a specific example of inputs to the dataset or function where verification properties do not hold.

In one implementation, where verification of a particular Model Verification Property (MVP) is initiated, the system will work to construct either a mathematical proof that the property always holds or produce an explicit counterexample, e.g., a set of inputs to the model that will lead to the violation of the specified property.

In an exemplary embodiment, the theorem prover 204D can be ATP including a Satisfiability Module Theory (SMT) solver, such as Alt-Ergo, Beaver, Boolector, MathSAT5, OpenSMT, SMTInterpol, SONOLAR, STP, veriT, Yices, Z3, and CVC4, for counterexample construction and the verification of first-order properties of non-recursive functions. Different SMT solvers may be implemented for different applications. For instance, Z3 is an SMT solver initially developed by Microsoft Research that is well equipped for providing counterexamples for sequences of function traces.

The theorem prover 204D receives the verification conditions and determines whether the verification conditions are valid. If the verification conditions are proved to be valid, then the program is said to be correct with respect to the given specifications. Otherwise, if the theorem prover 204D fails to establish one or more verification conditions, the theorem prover 204D produces counterexamples with correspondence to the failed verification conditions. In an exemplary embodiment, a counterexample is indicative of an execution trace whose final state is a failure state violating a certain property.

The program verification tool 200 further comprises a test-case generator 202. The test-case generator 202 is configured to receive, from the verification module 204, at least one erroneous function that failed to match the predefined verification conditions, and extract context data from at least one erroneous function; receive, from the verification module 204, the counterexamples and extract test data from the counterexamples, wherein the test data includes values of the input variables relevant to at least one erroneous function. The test-case generator 202 is further configured to construct a test case of a failing test based on the context data and the test data, wherein the program verification tool 200 is configured to run the failing test stepwise to observe the evolution of the set of computer-executable instructions in response to a failure state, and wherein bugs from the erroneous functions are removed based on the failing test, and the failing test is run on the set of computer-executable instructions until the set of computer-executable instructions are verified by the verification module 204. In one embodiment, the test-case generator 202 takes the counterexamples as input and generates test cases 205. The generated test cases, in accordance with one embodiment, are written in the same language as the input program or the input set of computer-executable instructions. In one embodiment, a test case for a certain function or procedure can be generated based upon a set of specific values for the input arguments.

Figure 3:
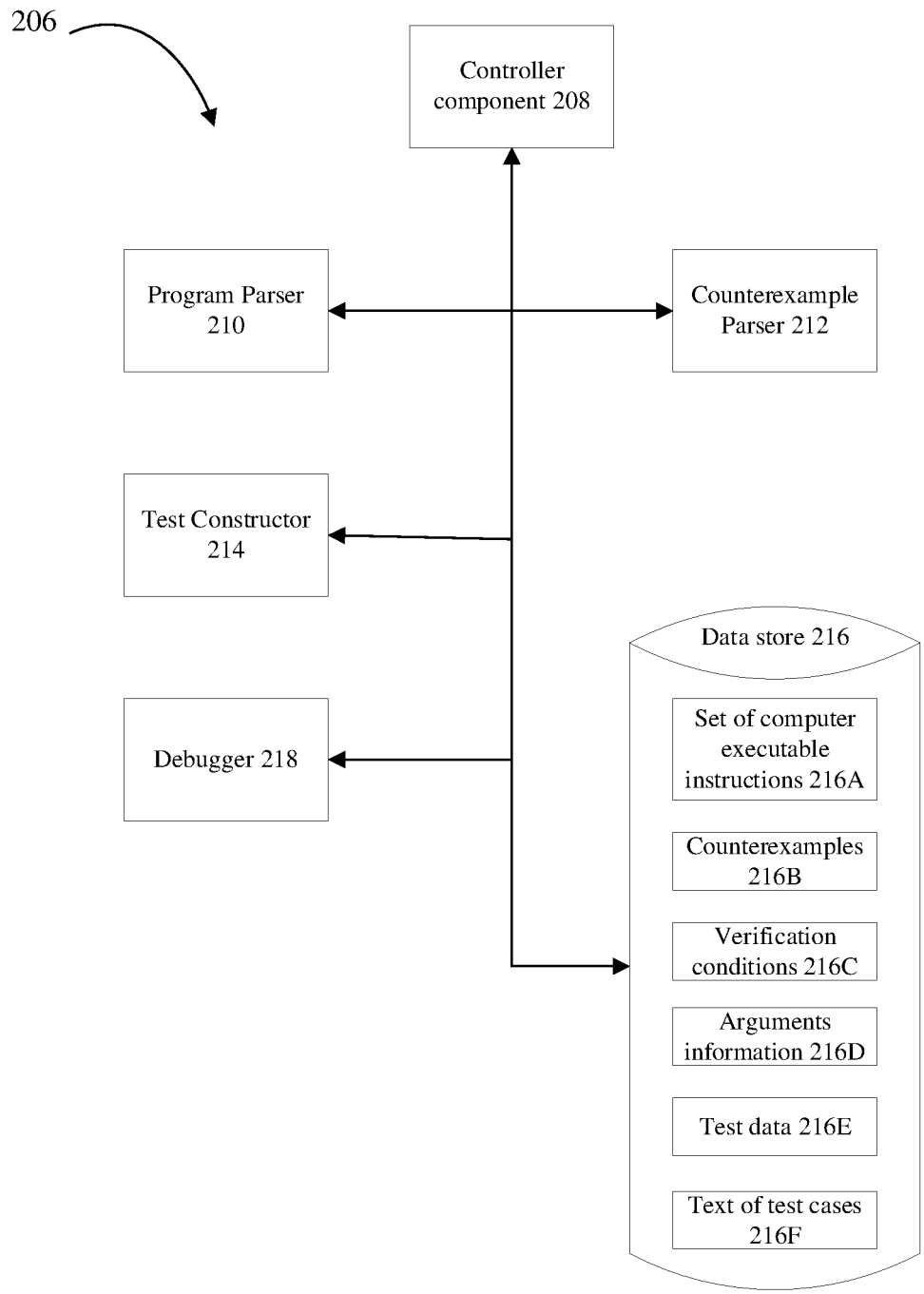
FIG. 3 shows a schematic view of a test-case generator used in the program verification tool, in accordance with an embodiment of the invention.

FIG. 3 shows a schematic view of a test-case generator 202 used in the program verification tool 200, in accordance with an embodiment of the invention. In some embodiments, the test-case generator 202 comprises a controller component 208 configured to obtain a list of erroneous functions from the verification module 204. The test-case generator 202 further comprises a program parser 210 to parse the intermediate instructions corresponding to the set of computer-executable instructions and extract context data. As known in the art, a parser is a computer program, usually but not necessarily part of a compiler or interpreter, that breaks input data such as program texts into smaller elements, usually as a step in their translation into another language or their interpretation for execution. Accordingly, the program parser 210 is configured to extract context data related to the erroneous functions, including relevant property types and information related to the input arguments of the erroneous functions. In other words, an erroneous function is broken down into a collection of smaller context datasets with respect to property types by the program parser 210. The test-case generator 202 further comprises a counterexample parser 212 to parse the counterexamples and extract test data. In some embodiments, the counterexample parser 212 is a component that reads text of counterexamples and extracts test data, which contains initial values of input arguments of the erroneous functions.

The test-case generator 202 further comprises a test case constructor 214 provided in communication with the program parser 210 and the counterexample parser 212. The test case constructor 214 is configured to construct the test case of the failing test based on the context data (from the program parser 210) and the test data (from the counterexample parser 212). In an embodiment, the test data includes values of relevant input variables, and wherein the value can be divided as basic values and reference values.

The test-case generator 202 further comprises a data store 216 to store a set of executable computer instructions 216A, at least one counterexample 216B, type properties of the verification conditions 216C, argument information relating to the erroneous functions 216D, test data extracted from the counterexample 216E, and text of test cases 216F. In one embodiment, the data store 216 can be or include a memory, a hard drive, or other suitable computer-readable data storage devices.

The test-case generator 202 further comprises a debugger 218 for debugging the erroneous function based on the generated test case at each step and repeating the debugging till the set of computer-executable instructions are corrected. In one implementation, the debugging can be an automated process. Examples of automated debuggers include code-based tracers, profilers, interpreters, etc.

Figure 4:
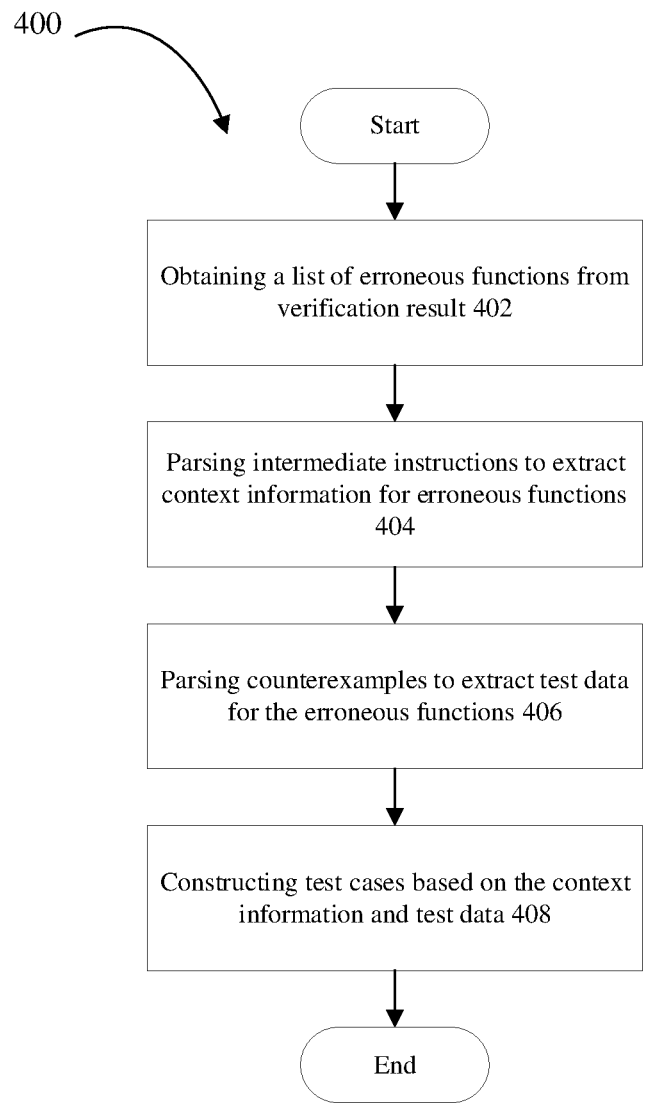
FIG. 4 shows a block diagram depicting operation of the test-case generator, in accordance with an embodiment of the invention.

FIG. 4 shows a block diagram depicting operation 400 of the test-case generator 202, in accordance with an embodiment of the invention. Referring to FIG. 4, an exemplary operation 400 of the test-case generator of generating test cases from failed proofs is illustrated. The operation 400 is depicted as a sequence of steps, which can be computer-executable instructions executed in one or more processors and stored on a computer-readable medium or media. The computer-executable instructions may include a routine, a sub-routine, programs, a thread of execution, and/or the like. Furthermore, the (intermediate) results of the acts may be stored in a computer-readable medium, displayed on a display device, and/or the like. The computer-readable medium may be any suitable computer-readable device, such as memory, hard drive, flash drive, or the like.

At block 402, the operation 400 includes the step of obtaining a list of erroneous functions from the verification result. In one embodiment, the verification result may be an output of the verification module 204. The list of erroneous functions thus obtained may be provided to the test-case generator 202, in accordance with one implementation.

At block 404, the operation 400 includes parsing intermediate instructions to extract context information for the erroneous functions. In one embodiment, the test-case generator 202 includes the program parser 208 for facilitating the parsing of the intermediate instructions to extract context information for the erroneous functions.

At block 406, the operation 400 includes parsing counterexamples to extract test data for the erroneous functions. In one embodiment, the test-case generator 202 includes the counterexample parser 210 for parsing counterexamples to extract test data for the erroneous functions.

At block 408, the operation 400 includes constructing test cases based on the context information and test data. In one embodiment, the test-case generator 202 includes the test case constructor 214 for constructing test cases based on the context information and test data. In one implementation, the execution of the operation 400 is repeated in a loop until no more erroneous functions are obtained from the verification result provided by the verification module 204. Such a scenario is an indication that the input set of computer-executable instructions are rectified and bug-free, in accordance with one embodiment of the invention.

Figure 5:
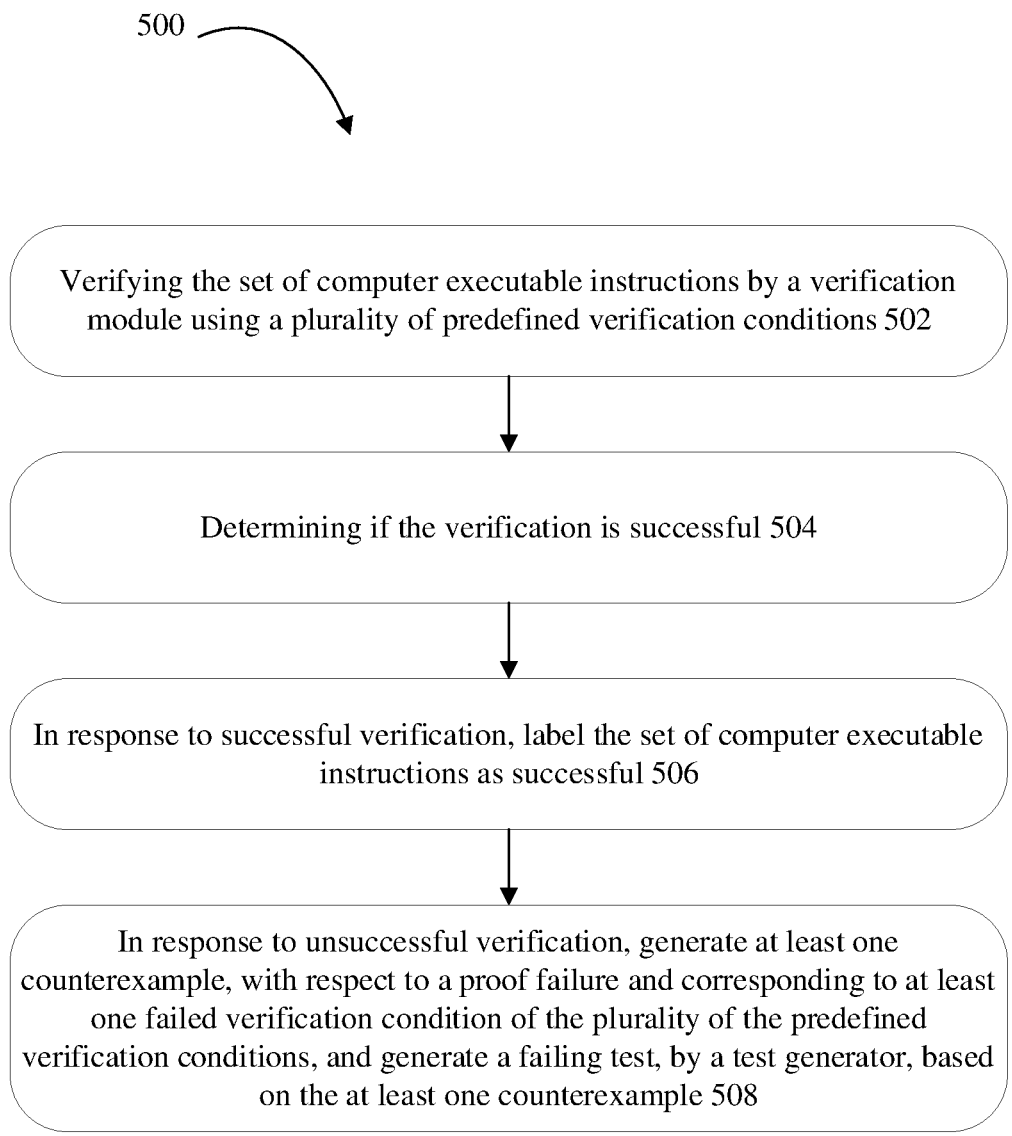
FIG. 5 shows a block diagram depicting a method for verifying a set of computer-executable instructions, in accordance with an embodiment of the invention.

The invention also relates to a method for verifying a set of computer-executable instructions using at least one failing test generated by the test-case generator 202. FIG. 5 shows a block diagram depicting a method for testing a set of computer-executable instructions (hereinafter interchangeably referred to as method 500), in accordance with an embodiment of the invention.

According to an aspect of the invention, method 500 may be executable by the program verification tool 200 shown in FIGS. 2 and 3. At block 502, the method 500 includes the step of verifying the set of computer-executable instructions by a verification module using a plurality of predefined verification conditions. In an exemplary embodiment, the verification of the set of computer-executable instructions is performed by the verification module 204 of the program verification tool 200. As mentioned previously, the step of verification of the set of computer-executable instructions may be performed via proof.

At block 504, the method 500 includes the step of determining if the verification is successful. In one embodiment, the verification module 204 is configured to determine if the verification is successful.

At block 506, the method 500 includes the step labeling the set of computer-executable instructions as successful of in response to successful verification. In one embodiment, the verification module 204 is configured to label the set of computer-executable instructions as successful in response to successful verification.

At block 508, the method 500 includes the step of generating at least one counterexample, with respect to a proof failure in response to unsuccessful verification, wherein the proof failure corresponds to at least one failed verification condition of the plurality of the predefined verification conditions, and generating at least one failing test, by a test-case generator, based on at least one counterexample. In one embodiment, the generating at least one counterexample is performed via the theorem prover 204D and generating the failing test is performed via the test-case generator 202, both shown in FIG. 2.

In one embodiment, the step of generating the failing test includes obtaining, by the controller component 208 of FIG. 3, a list of erroneous functions from the verification module 204 of FIG. 2. With the program parser 210 of FIG. 3, context information is extracted related to the obtained erroneous functions. The counterexample parser 212 parses at least one counterexample to extract test data from at least one counterexample, wherein the test data comprises values of relevant input variables. A test case is generated, based on the context information and the test data, to test the obtained erroneous functions. In an embodiment, the generation of the test case is performed by the test case constructor 214 of FIG. 3.

According to one implementation of the method 500, the generated test case is applied to the erroneous function of the set of computer-executable instructions to identify a bug present in the erroneous function, and upon identification, the bug is rectified, and the erroneous function is corrected.

According to one aspect, the method 500 further includes running the failing test step by step and observing the program evolution in response to a failure state. According to one aspect, the method 500 further includes re-running the failing test upon fixing the program, and programmers can re-run the proof and repeat the process until no proof failure occurs. More specifically, the set of computer-executable instructions that are provided as the input in a step-by-step manner are tested in a step-by-step manner as well. Such a testing method allows the programmer to rectify one fault from the set of computer-executable instructions at a time, where the programmer can rectify each fault by observing the program evolution of the set of computer-executable instructions in response to the failure state. After making the observations, the programmer can make the required rectifications and re-run the proof and repeat the process until no proof failure occurs.

According to one aspect, the method 500 further comprises interfacing the set of computer-executable instructions with the verification module 204 of FIG. 2 through Verifier Application Programming Interface (API) 204A. More specifically, verifier API 204A provides an integrated development environment (IDE) for verification. The test script or the text of test cases generated by the test-case generator 202 may be fed back to the verifier API 204A for allowing the programmer to rectify the bugs therein, thereby preparing a modified set of computer-executable instructions to be verified by the verification module 204 and tested by the test-case generator 202.

According to one aspect, the method 500 further comprises generating a test case for a specific function based upon a set of specific values for the input arguments.

According to one aspect, the method 500 includes translating the set of computer-executable instructions into intermediate instructions and translating the intermediate instructions into a collection of verification conditions based on specific formal semantics including axiomatic semantics, Hoare logic, and Dijkstra's weakest precondition. In one embodiment, the program translator 204B of FIG. 2 translates the set of computer-executable instructions into intermediate instructions. In an exemplary embodiment, the set of computer-executable instructions can be written in Eiffel language (an object-oriented language) and translated to intermediate instructions written in Boogie language by the program translator 204B.

According to one aspect, the method 500 includes receiving the plurality of the verification conditions by the theorem prover 204D of FIG. 2 for determining validity of the plurality of verification conditions. The theorem prover 204D generates the counterexamples in case one or more of a plurality of verification conditions are not valid. In an embodiment, a counterexample is an execution trace that is indicative of a proof failure.

The program verification tool 200 of FIG. 2 and the method 500, according to certain embodiments of the invention, provide automatic generation of failed tests for further step-by-step debugging of the input program or input set of computer-executable instructions to attempt to identify the "bug" causing the generated test to fail. The program verification tool 200 of FIG. 2 and the method 500 of FIG. 5, according to certain embodiments of the invention, make the process of full program proofs practical and realistic by combining the benefits of proofs and tests. According to one aspect, the program verification tool 200 and the method 500 complement failed proof attempts with a runnable failing test that highlights the incorrectness of the program or the set of computer-executable instructions. The failing test makes it possible to debug the program and figure out the root cause of the proof failure.

The invention claimed is:

1. A method for verifying a set of computer-executable instructions using at least one failing test generated by a test-case generator, the method comprising:
   verifying the set of computer-executable instructions by a verification module using a plurality of predefined verification conditions, wherein at least one of the plurality of predefined verification conditions are associated with the execution of the set of computer-executable instructions;
   determining if the verification is successful;
   in response to successful verification, labeling the set of computer-executable instructions as successful; and
   in response to unsuccessful verification, generating at least one counterexample, with respect to at least one proof failure and corresponding to at least one failed verification condition of the plurality of the predefined verification conditions,
   wherein the at least one counterexample is a specific one or more inputs to a dataset or function of software code associated with the set of computer-executable instructions wherein at least one of the plurality of the predefined verification conditions fail and are indicative of the at least one proof failure, and generating a failing test, by a test-case generator, based on at least one counterexample including the specific one or more inputs to a dataset or function associated with the set of computer-executable instructions.

2. The method of claim 1, wherein the step of generating the failing test further comprises:
   obtaining, by a controller component, a list of erroneous functions from the verification module,
   extracting, by a program parser, context information relating to the obtained erroneous functions,
   parsing, by a counterexample parser, at least one counterexample to extract test data from at least one counterexample, wherein the test data comprises values of relevant input variables, and
   generating a test case, based on the context information and the test data, to test the obtained erroneous functions.

3. The method of claim 1, wherein the failing test is applied to at least one of the obtained erroneous functions as an erroneous function to identify a bug present in the erroneous function, and upon identification, the bug is rectified, and the erroneous function is corrected.

4. The method as of claim 1, further comprising the step of running the failing test step by step and observing program evolution in response to a failure state.

5. The method of claim 1, further comprising re-running the failing test upon fixing the program.

6. The method of claim 1, further comprising the step of receiving the plurality of the verification conditions related to the failing test by the verification module for determining validity of the plurality of verification conditions.

7. The method of claim 1, further comprising the step of interfacing the set of computer-executable instructions with the verification module through a verifier Application Programming Interface (API).

8. The method of claim 1, further comprising the step of executing the verification module in an integrated development environment (IDE) for verification.

9. The method of claim 1, wherein the step of generating a failing test further comprises generating a set of specific values for input arguments for a specific function.

10. The method of claim 1, wherein the step of generating a failing test further comprises translating the set of computer-executable instructions into intermediate instructions and translating the intermediate instructions into a collection of verification conditions based on specific formal semantics including axiomatic semantics, Hoare logic, or Dijkstra's weakest precondition.

11. The method of claim 1, wherein the counterexample is an execution trace that is indicative of a proof failure.

12. A program verification tool to verify a set of computer-executable instructions using at least one failing test generated by a test-case generator, the program verification tool comprising:
   instructions that, when executed by a processor, cause the processor to implement:
   a) a verification module including a verification condition generator configured to generate a plurality of predefined verification conditions, and
   a theorem prover configured to verify the set of computer-executable instructions based on the predefined verification conditions, determine failed verification conditions, and produce a counterexample, with respect to a proof failure, corresponding to a failed verification condition, wherein the counterexample is an execution trace that is an indicative of a failed proof; and
   b) a testing generator configured to receive, from the verification module, at least one erroneous function that failed to match the predefined verification conditions, and extract context data from at least one erroneous function, the testing generator further configured to receive, from the verification module, the counterexamples and extract test data from the counterexamples, wherein the test data includes values of input variables relevant to at least one erroneous function, the testing generator further configured to construct a test case of a failing test based on the context data and the test data, wherein the program verification tool is configured to run the failing test stepwise to observe evolution of the set of computer-executable instructions leading to a failure state, and wherein bugs from the erroneous functions are removed based on the failing test, and the failing test is run on the set of computer-executable instructions until the set of computer-executable instructions are verified by the verification module.

13. The program verification tool of claim 12, wherein the verification module further comprises:
   a verifier Application Programming Interface (API) providing a programming interface for the program verification tool, wherein the verifier API corresponds to a programming language of the set of computer-executable instructions;
   a program translator to receive the set of computer-executable instructions, and translate the set of computer-executable instructions into intermediate instructions written in a verification language;
   a verification condition generator to translate the intermediate instructions into a collection of verification conditions and generate a set of predefined verification conditions.

14. The program verification tool of claim 12, wherein the test-case generator comprises:

a controller component to obtain a list of erroneous functions from the verification module;

a program parser to parse intermediate instructions corresponding to the set of computer-executable instructions and extract context data;

a counterexample parser to parse the counterexamples and extract test data; and a test case constructor, in communication with the program parser and the counterexample parser, to construct the test case of the failing test based on the context data and the test data.

15. The program verification tool of claim 13, wherein the verification condition generator is configured to translate the intermediate instructions based on one or more formal semantics including axiomatic semantics, Hoare logic, and Dijkstra's weakest precondition.

16. The program verification tool of claim 12, wherein the test data include values of relevant input variables, and wherein the values can be divided as basic values and reference values.

17. The program verification tool of claim 12, further comprising a data store to store a set of executable computer instructions, at least one counterexample, type properties of the verification conditions, argument information relating to the erroneous functions, test data extracted from the counterexample, and text of test cases.

18. The program verification tool of claim 12, further comprising a debugger for debugging the erroneous function based on the generated test case at each step and repeating the debugging till the set of computer-executable instructions are corrected.

19. The method of claim 1, wherein the program verification tool is configured to run the failing test stepwise to observe evolution of the set of computer-executable instructions leading to a failure state.

20. The method of claim 1, wherein bugs from an erroneous function are removed based on the failing test, and the failing test is run on the set of computer-executable instructions until the set of computer-executable instructions are verified.

* * * * *